UNITED STATES PATENT OFFICE.

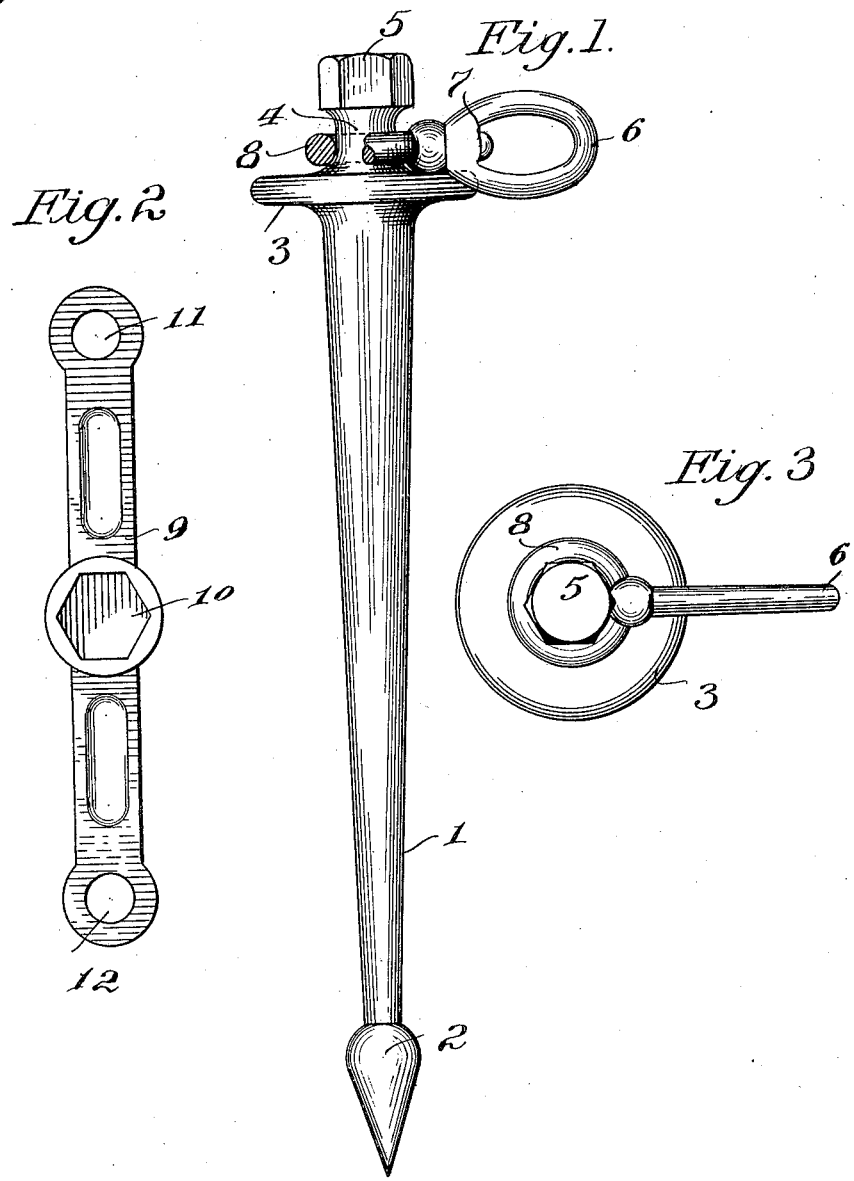

ISAAC M. FRY, OF MAYMONT, SASKATCHEWAN, CANADA.

ANCHOR-PIN.

1,092,036.  Specification of Letters Patent.  Patented Mar. 31, 1914.

Application filed January 4, 1910.  Serial No. 536,298.

*To all whom it may concern:*

Be it known that I, ISAAC M. FRY, a subject of the King of England, residing at the village of Maymont, in the Province of Saskatchewan and Dominion of Canada, have invented new and useful Improvements in Anchor-Pins, of which the following is a specification.

The invention relates to an improved anchor pin adapted to be used for tethering cattle, or the like.

The main object of the present invention is the provision of an anchor pin which may be readily inserted into the ground without necessitating the usual driving operation and which when inserted tends materially to resist any lateral strain in so far as withdrawing the pin is concerned.

The invention in its preferred details of construction will be described in the following specification, reference being had particularly to the accompanying drawings, in which:—

Figure 1 is a perspective of the improved pin, the wrench bar being omitted. Fig. 2 is a bottom plan view of the wrench member. Fig. 3 is a top plan view of the pin.

Referring particularly to the accompanying drawings, the improved anchor pin comprises a body 1 which may be of any desired length or sectional area, said body being preferably circular in section and gradually tapering from the upper to the lower end. At the lower end the body 1 is provided with a spear point 2 which point is circular in section and in the maximum transverse dimension materially greater than the transverse dimension of the smaller end of the pin. At the opposite or remote end the body 1 is provided with a transversely disposed disk 3 having a diameter materially greater than the diameter of the adjacent end of the body. Beyond the disk there is arranged a concaved bearing projection 4 arranged in alinement with the body of the pin and terminating at its upper end in an angularly shaped head 5, preferably of conventional nut form. An eye 6 is connected by a swivel connection 7 to a ring 8 encircling the bearing projection 4, the connection between the ring and bearing being comparatively loose to permit free movement of the eye 6 on said bearing as a center.

In connection with the pin described I utilize a wrench bar comprising an elongated bar like member 9 centrally formed with a socket 10 to more or less loosely fit the head 5 of the pin. One terminal of the bar is formed with an opening 11 designed to be connected to the ring 6 when the bar is in place by any appropriate flexible connector. The opposite end of the bar 9 is formed with an opening 12 to receive the ends of a tether rope, or the like.

In applying the pin the latter is forced into the ground by a turning movement secured through the medium of the bar 9 in coöperation with the head 5. The pin will finally seat itself with the disk in close contact with the surface of the ground, after which the picket rope may be attached to the opening 12 and tightened in any usual or desired manner. The point 2 serves in a measure to prevent withdrawal of the pin, while the disk serves to effectively prevent endwise strain on the bar 9 from tilting or inclining the pin toward such strain, thereby serving to maintain a more or less solid connection of the pin with the ground at all times. The use of the bar brings any strain which may be brought to bear upon the anchor pin in a direct line at right angles to the length of the pin, as the connection between the bar and picket rope is some distance beyond the pin proper and therefore the strain is transmitted to the pin by the bar, and the latter is of course at right angles to the bar the connection between the bar and eye 6 preventing disconnection of the bar and pin and at the same time permitting the lifting of the bar from the head 5 if desired in applying or removing the pin. The pin is of course to be made of any desired material and in any size best adapted for the purpose for which it is designed.

Having thus described the invention, what I claim as new, is:—

A picket pin consisting of a body having an intermediate conical portion with a smooth exterior surface and which is circular in transverse section throughout its length, said body having at the smaller end of said intermediate portion a conical spear portion which is of greater transverse diameter than the smaller end of the said intermediate portion and of less transverse diameter than the larger end thereof, said spear portion having a smooth exterior surface and being globular at one end and provided with a point at its other end, a disk formed at the larger end of the said intermediate portion of the body and a ring surrounding the body above the disk and normally supported by the disk.

In testimony whereof I affix my signature in presence of two witnesses.

ISAAC M. FRY.

Witnesses:
R. McLaren,
W. J. Mawhinney.

Copies of this patent may be obtained for five cents each, by addressing the "Commissioner of Patents, Washington, D. C."